Dec. 5, 1933.  A. N. MERLE  1,937,976

FILM PRESSING ARRANGEMENT FOR MOTION PICTURE APPARATUS

Filed Nov. 28, 1930  2 Sheets-Sheet 1

ANDRÉ NOËL MERLE
INVENTOR

Dec. 5, 1933.    A. N. MERLE    1,937,976
FILM PRESSING ARRANGEMENT FOR MOTION PICTURE APPARATUS
Filed Nov. 28, 1930    2 Sheets-Sheet 2

Patented Dec. 5, 1933

1,937,976

UNITED STATES PATENT OFFICE 1,937,976

FILM PRESSING ARRANGEMENT FOR MOTION PICTURE APPARATUS

André Noël Merle, Vincennes, France, assignor to Pathe Cinema, Anciens Etablissements Pathe Freres, Paris, France Application November 28, 1930, Serial No. 498,526, and in France January 6, 1930

7 Claims. (Cl. 88—17)

The invention relates to pressing members for motion picture apparatus.

Usually, in the motion picture apparatus, the pressing plate is carried by a frame which is secured or pivoted to a wall of the casing.

The present invention has for its object to eliminate this frame and to provide for the ready and proper positioning of film in the loading operation.

According to the invention, the pressing member is loose and guided on a fixed stud and is urged against the gate by a spring fixed at one of its ends.

Said pressing member comprises at its upper and lower ends suitable guiding surfaces for the face of the film, as well as lateral flanges for guiding the film at one side in the transverse direction, said film being guided at the other side by the wall surface cooperating with the pressing member.

Further features and advantages of the invention will be specified in the following description.

The accompanying drawings show by way of example an embodiment of the invention.

Figure 1:
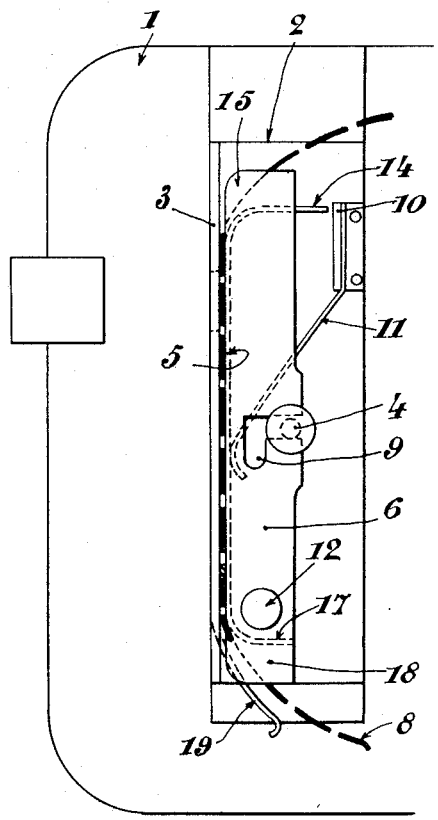
Fig. 1 shows in side elevational view, the pressing member in the operative position and the associated parts.

1 denotes a partition of the casing of a motion picture apparatus, which is parallel with the optical axis of the apparatus. To partition 1 is secured a plate 2 which carries the film gate 3 and on which is mounted a fixed stud 4.

The film pressing member consists of a U-shaped sheet metal member whose central web 5 serves to press the film 8 against the gate 3 and whose lateral flanges 6 and 7 are formed with identical slots 9 engaged by stud 4; each slot 9 has a transverse portion into which opens a longitudinal portion, as shown. To an angle bracket 10, secured to plate 2, is attached one end of a spring 11 whose other end bears upon the central web 5 of the pressing member, at a point situated beyond the transverse plane containing the axis of stud 4. Said pressing member is provided, on flange 6, with an operating knob 12.

Figure 3:
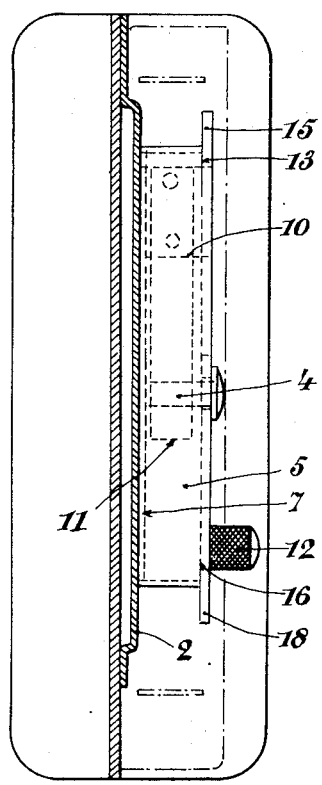
Fig. 3 is a section on the line III—III of Fig. 2.

A slit 13 is cut in the upper part of the pressing member between central web 5 and lateral flange 6 and the upper end of said central web is curved inwardly in such maner as to form an upper guiding surface 14 for the film; as shown in Fig. 3 flange 7 is shorter than flange 6 and does not extend beyond portion 14; on the contrary, lateral flange 6 extends beyond portion 14, thus forming a lug 15 which prevents lateral motion of the film, guided on the opposite side by plate 2. Guiding portion 14 is extended in such manner that, in the operating position corresponding to Fig. 1, the free end of portion 14 lies adjacent angle bracket 10.

In the like manner, a slit 16 is formed at the lower part of the pressing member, thus forming a lower guiding portion 17; flange 7 does not extend beyond portion 17 while flange 6 forms a lower lug 18. A tongue 19 cut in the gate and bent as shown in Figs. 1 and 2 also serves to guide the film.

Figure 2:
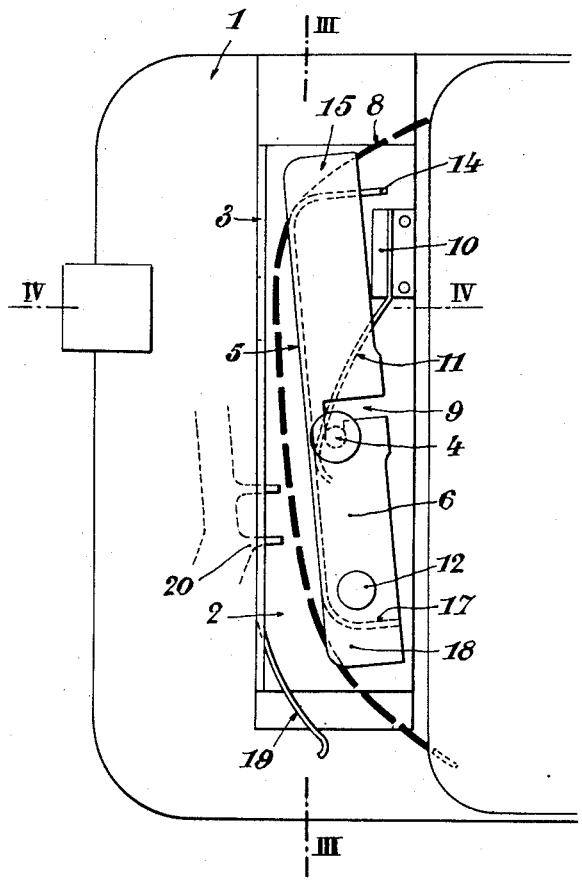
Fig. 2 is a view similar to Fig. 1, showing the parts in the loading position.
Figure 4:
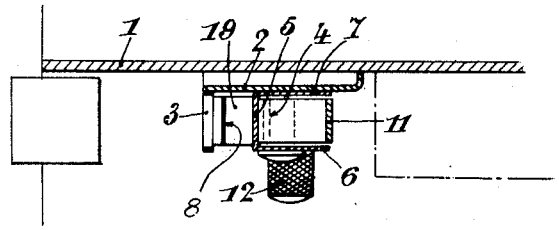
Fig. 4 is a section on the line IV—IV of Fig. 2.

When the apparatus is in the loading position, as shown in Fig. 2, the pressing member is firmly held by spring 11, which engages web 5 at a point beyond the transverse plane containing the axes of stud 4 and urges said pressing member about said stud in the clockwise direction, thus pressing the upper corner of said member against the stop surface formed by the angle bracket 10; said stop has such a position that the pressing member is held in an inclined position with reference to gate 3, the lower portion of said member being farthest from said gate. In this manner the film can be more readily positioned and removed in spite of the presence of the feeding claws 20.

To proceed from the loading position as shown in Fig. 2, to the operating position as shown in Fig. 1, the operator lowers knob 12 while drawing to the right, in such manner that curved portion 14 is moved away from bracket 10, stud 4 entering the transverse portion of slots 9, spring 11 thus urging the pressing member against gate 3. By a reverse operation, the pressing member is moved from the position shown in Fig. 1 to the position shown in Fig. 2.

When the device is in the operative position, as shown in Fig. 1, the guiding portion 14 prevents the pressing member from receding from gate 3 under the action of an abnormal stress, due to the provision of bracket 10 which is then engaged by the end of portion 14.

This arrangement affords a pressing device of a very simple, durable and inexpensive construction, which operates in a more reliable manner than the known devices of a more complicated construction.

Obviously, the constructional form above described is susceptible of various modifications without departing from the principle of the invention.

Having now described my invention what I claim as new and desire to secure by Letters Patent is:

1. In a motion picture apparatus, a gate, a loose pressing member, a pivoted and slidable connection provided on said pressing member and on the apparatus casing, whereby said pressing member is adapted to be moved towards and away from said gate and to be pivoted about said connection, a fixed stop on one side of said pivoted and slidable connection and adapted to cooperate with the face of said pressing member turned away from said gate when said pressing member is moved away from said gate, resilient means bearing on said pressing member on the other side of said pivoted and slidable connection and adapted to urge said pressing member towards said gate, and operating means secured on said pressing member on said other side of said connection, whereby said presssing member may be displaced away from said gate.

2. In a motion picture apparatus, a gate, a loose pressing member, a pivoted and slidable connection provided on said pressing member and on the apparatus casing, whereby said pressing member is adapted to be moved towards and away from said gate and to be pivoted about said connection, on one side of said pivoted and slidable connection, a feeding claw device adapted to project through said gate, resilient means bearing on said pressing member and adapted to urge said pressing member towards said gate, and operating means secured on said pressing member whereby said pressing member may be displaced away from said gate, and on the other side of said pivoted and slidable connection a fixed stop adapted to cooperate with the face of said pressing member turned away from said gate when said pressing member is moved away from said gate, whereby said pressing member is inclined in the loading position, so as to clear the feeding claw device in said position and to allow the film to be easily threaded and removed.

3. In a motion picture apparatus, a film guiding arrangement comprising a loose pressing member, a guideway in said member, a fixed stud secured to the apparatus casing and engaging said guideway, whereby said member is free to move to and from the gate of the apparatus in the operative position, a notch opening into said guideway for receiving said stud in the loading position, a fixed stop adjacent one end of said member, and resilient means engaging said member at a point situated on the side opposite said stop with respect to said stud for urging said member about said stud against said stop.

4. In a film pressing arrangement as claimed in claim 3, a projection on the back of said pressing member located adjacent said fixed stop, said projection being adapted to engage said stop and limit the displacement of said pressing member away from said gate in the operative position and being further adapted to be moved clear of said stop when said stud engages said notch in the loading position.

5. In a motion picture apparatus, a loose U-shaped sheet metal pressing member having a central web facing the gate of the apparatus and curved between the flanges of said member at both ends, one curved end projecting to the rear of said member, a fixed stop adjacent said projecting end, resilient means for urging said web against said gate, slots in the lateral flanges of said member and a fixed stud engaging said slots.

6. In a motion picture apparatus, a gate, a longitudinal plate at right angles with said gate, a pressing member movable in contact with said plate to and from said gate, and having curved film guiding surfaces at both ends, a flange on the side of said member remote from said plate, extending beyond said guiding surfaces to position the film with one edge in contact with said plate, means for guiding said member to and from said gate and means for resiliently urging said member toward said gate.

7. A motion picture apparatus as claimed in claim 3 wherein said guideway consists of a transverse slot in which said stud is adapted to travel in operative conditions, said notch opening at one side of said slot.

ANDRÉ NOËL MERLE.